US009336670B2

(12) United States Patent
Jones, Jr. et al.

(10) Patent No.: US 9,336,670 B2
(45) **Date of Patent: *May 10, 2016**

(54) METHOD FOR REMOTE INITIALIZATION OF TARGETED NONLETHAL COUNTER MEASURES IN AN ACTIVE SHOOTER SUSPECT INCIDENT

(71) Applicant: NetTalon Security Systems, Inc., Fredericksburg, VA (US)

(72) Inventors: Donald R. Jones, Jr., New Canton, VA (US); Ronald Dubois, Dumfries, VA (US); Mason B. Wooldridge, New Canton, VA (US)

(73) Assignee: NetTalon Security Systems, Inc., Fredericksburg, VA (US)

( * ) Notice: Subject to any disclaimer, the term of this patent is extended or adjusted under 35 U.S.C. 154(b) by 330 days.

This patent is subject to a terminal disclaimer.

(21) Appl. No.: 14/073,049

(22) Filed: Nov. 6, 2013

(65) Prior Publication Data

US 2015/0124087 A1 May 7, 2015

(51) Int. Cl.

| | |
|---|---|
| ***H04N 7/18*** | (2006.01) |
| ***G08B 15/02*** | (2006.01) |
| ***G08B 19/00*** | (2006.01) |
| ***G08B 25/14*** | (2006.01) |
| *G08B 13/196* | (2006.01) |

(52) U.S. Cl.
CPC .............. *G08B 15/02* (2013.01); *G08B 19/005* (2013.01); *G08B 25/14* (2013.01); *G08B 13/19695* (2013.01)

(58) Field of Classification Search
CPC ........................................................ H04N 7/18
USPC .......................................................... 348/143
See application file for complete search history.

(56) References Cited

U.S. PATENT DOCUMENTS

| | | | |
|---|---|---|---|
| 6,281,790 | B1 | 8/2001 | Kimmel et al. |
| 6,917,288 | B2 | 7/2005 | Kimmel et al. |

(Continued)

FOREIGN PATENT DOCUMENTS

| | | | |
|---|---|---|---|
| GB | 2325548 | 11/1998 | |
| WO | WO 2010056375 A1 * | 5/2010 | .............. F41H 13/00 |

OTHER PUBLICATIONS

Office Action in U.S. Appl. No. 13/313,512 mailed May 22, 2014; 22 pages.

*Primary Examiner* — Paulos M Natnael
(74) *Attorney, Agent, or Firm* — Thomas & Karceski, P.C.

(57) ABSTRACT

The present invention is directed to providing a method and system that enables a first responder police Incident Commander to take command and control of a building having an active suspect ongoing event. Using the method and system herein, the Police Incident Commander is able to clearly distinguish the positions of his building entry teams (BETs) in the building relative to the position of the suspect through a graphic display of Friend and Foe designation whereupon he can precisely direct their maneuver to close with the suspect. The incident commander communicates to a Command and Control Center to arm non-lethal chemical canisters pre-located in “Hot Zones” for use in remotely incapacitating the intruders. When the intruders, boxed in by the BETs, enter a “Hot Zone” the incident commander gives the command to release the non-lethal chemical/smoke, ammonia spray that disorients and blinds the intruders allowing the BETs to safely end the incident.

9 Claims, 13 Drawing Sheets

(56) References Cited

U.S. PATENT DOCUMENTS

| | | | | |
|---|---|---|---|---|
| 6,972,676 | B1 | 12/2005 | Kimmel et al. | |
| 9,159,210 | B2 * | 10/2015 | Jones, Jr. | G08B 13/19645 |
| 2007/0008099 | A1 | 1/2007 | Kimmel et al. | |
| 2008/0122609 | A1 * | 5/2008 | Mannisto | G08B 19/005 340/500 |
| 2010/0245083 | A1 * | 9/2010 | Lewis | G08B 7/066 340/540 |
| 2013/0169817 | A1 * | 7/2013 | Jones | G08B 25/00 348/159 |

* cited by examiner

Figure 9 – Shooter enter school and shoot student leaving office.

Figure 12
200
203d
D
CD
125
155
68
LIBRARY
TEACHER LOUNGE
AD
172
SCIENCE LAB
120
STAIRS
188
142
182
130
180
192
Classroom 203
Classroom 202
Classroom 201
165
160
184
203a
BIOLOGY LAB
A
C
203c
145
Boy's Restroom
186
SECOND FLOOR
177
BC
203b
N
150
152
AB
B
141
LEGEND
SMOKE
SECURITY
SECURE DOOR
SIGNAL STATION
ALARM
RFID
THREAT
AGENT
DTS
CAMERA
ARRAY
205
FLOORS
5
4
3

METHOD FOR REMOTE INITIALIZATION OF TARGETED NONLETHAL COUNTER MEASURES IN AN ACTIVE SHOOTER SUSPECT INCIDENT

The present invention generally relates to the remote, electronic initial locating and identification of a suspect in an incident in a building environment like a school, college, hotel or hospital. Once identified, the method includes remote electronic tracking of the suspect(s) while officers are en-route. Finally, the method includes the electronic, remote initiation of targeted nonlethal counter measures to either cease or disrupt the suspect's attack.

BACKGROUND

In the most common example, persons who live, go to school or work in a building and who are immediately caught in an Active Shooter event are typically fleeing for their lives, and those outside the danger area in other parts of the building may not know for some time of the ongoing danger. There is usually no electronic alert system or automated voice system in a building to warn building occupants of a potential Active Shooter event as there is for a building fire alarm. In public schools, the administration will make a loud speaker announcement if it is under attack and in colleges, a campus wide alert system will be activated at a point someone can make an emergency 911 call. Active shooter statistics show that these alerts often occur two or more minutes after the incident begins. A campus wide texting system may activate several minutes after the official alert notified the police.

Many people may be shot before a 911 call is received and the 911 operator will try and get information about the shooter(s) and their location(s). There will be a number of 911 calls coming from the incident scene, but in the next 2-3 minutes police most likely will not have a suspect description, the number of shooter(s), or the location of the shooter(s). When police arrive on scene they will form building entry teams and the senior officer on the scene will assume incident command and continue to be in communication with the 911 police dispatch officer for any information coming from individuals trapped in the building.

Once on site, building entry teams (BETs) enter the building and move in different directions in search of the shooter(s) and the location(s) of victim(s) while simultaneously seeking useful on-site information. At this time, BETs generally don't have a subject description. Police often seek information from victims while assisting victims to safety. Once they finally pinpoint a last location and possibly a description of the shooter(s), police continue searching the building. They listen for gunfire to alert them of the shooter's general location. The building entry teams generally do not have any knowledge of the interior building space other than their building reference system of A side (street side), then clockwise B side, C side and D side of the building. Building entry teams only have their radios to try and coordinate their location and movement. Unless they can orient on gunfire they don't know where the shooter(s) are or if they are still in the building.

The incident Commander has little if any ability for a proactive command as he is dependent on the building entry teams for real-time intelligence. He may or may not have building floor plans to familiarize him with the building or to plot the locations of his teams in the building. Law enforcement understands that the quicker they can close with the shooter the quicker they will stop the killing. Unfortunately, in today's environment their movement in the building is a time consuming extensive search, for the suspect(S) unless the team happens to luck out through gunfire echo's and receipt of timely intelligence from victims calling for help on a cell phone. In such an environment, where an Active Shooter is not contained and multiple police teams are in the building, command and control is difficult and friendly fire is always a concern as all fingers are on triggers.

SUMMARY

The present invention is directed to a method and system that enables law enforcement officers at a tactical workstation located at a headquarters in communication with an en-route Incident Commander (IC) who can similarly view the incident on his own mobile data computer/tactical tablet to coordinate the nonlethal targeting of a suspect through real-time, immediate actionable intelligence as to the suspect's proximity to preinstalled "Hot Zones" that are armed with a nonlethal chemical agent such as a cocktail of pepper spray, smoke and ammonia. Each hallway motion detector is covered by three (3) pressurized pepper spray/smoke, ammonia canisters. Two canisters will be placed at either end of the "Hot Zone" with the third one protecting the middle of the "Hot Zone". The 360 degree motion detector has a 20 foot alarm zone; 10 feet on either side of the detector. Two of the nonlethal spray canisters are installed on a corridor wall 15 feet on either side of the motion detector while the third canister is placed in line with the motion sensor on the opposite side of the corridor effectively forming an equilateral triangle shaped "Hot Zone". By knowing the suspect's location and direction of movement and verifying intruder movement using video surveillance, the suspect's approach into a predefined "Hot Zone" can be anticipated. On a graphic display, the officer manning the tactical work station at police HQ will be tracking the suspect in real-time (1-3 seconds) viewing the suspect's movement via motion detectors whose icon on the graphic display turns yellow (designated as the FOE) when in alarm. The officer will have the appropriate camera accessed to verify the movement is that of the suspect using live video. The officer will then enter a code that will enable the nonlethal pepper spray/smoke, ammonia canisters for firing.

On the graphic display there is a "Firing" icon on either side of the motion detector that the suspect will put into alarm when the suspect is in detection range. When the motion goes in alarm the officer will mouse click each icon firing each canister within 1-2 seconds covering the "Hot Zone" with the non-lethal pepper spray/smoke, ammonia. This counter measure, by being activated with accurate position location and real-time firing when the suspect is in the "Hot Zone" has a high probability of placing a high dosage of the non-lethal chemical spray on the suspect thus disrupting or ending the attack.

Closing with the suspect is the priority in, for instance, an Active Shooter operation. In many schools, especially in rural areas, the response time can be much more than three minutes giving the shooter additional time to seek and injure or kill innocent victims. If the shooter is armed with pipe bombs and incendiary devices the situation becomes more acute. The ability to remotely take command of the incident gives law enforcement a significant tactical advantage in the incident before responders arrive at the building. The key to initiating remote counter measures is the receipt of accurate actionable intelligence in real-time.

This intelligence comes from several electronic sources. During the incident, any building staff member carrying an emergency key fob transmitter can activate the security system by pressing the key fob which arms the nearest threat security sensor, for instance an RF receiver, that sends the alert to the security alarm panel whereupon the system goes into alarm and a threat icon is automatically displayed on all graphic display monitoring stations that are deployed in the occupied space and remotely at Police HQ and District Stations. The graphic display shows sensors, cameras and RFID reader icons overlaid on building floor plans that are labeled A, B, C and D with A side being the street address side and the others identified clockwise.

Within 1-3 seconds both in-building and remote police monitoring stations receive an emergency alert from the building security alarm panel. Operators can quickly drill down to the emergency threat icon that orients law enforcement to the location of the attack. For example, the threat icon could appear on the graphic display on the 1$^{st}$ floor C side which is physically the back side of the building on the ground floor. Given only a few seconds have passed, that will be the general location of the shooter. When the Emergency Key Fob is pressed all hallway motion detectors and IP video cameras are activated enabling remote access of the IP cameras by police. Motion detectors in the vicinity of the threat icon display are the focus of immediate police observation. Where security motion detectors are in alarm, the suspect and or victims are physically present at the moment. Police officers at the monitoring stations in a command and control center tap the closest camera for video intelligence. Confirmation of the suspect shooter is likely obtained this way. Once the suspect is located and identified, his movements can be precisely tracked.

Further electronic intelligence for acquiring the suspect location or activity can come from signaling stations installed in occupied spaces (e.g., classrooms, or designated safe rooms (protected shelters) throughout the building. A signaling station is used by the teacher to indicate the status of the classroom; either safe or Rescue if that room is under attack. Such activation immediately changes the color of that signaling station icon on the graphic display showing an emergency condition. That information will be confirmed by security motion detectors in alarm or recently in alarm and by real-time video surveillance. Further isolation of the suspects from victims occurs as a building alert system comprised of the evacuation signaling array (blue, flashing light) and speakers (aural alert) are activated indicating to all building occupants that an Active Shooter incident is underway, and to immediately seek refuge in a safe haven. These actions effectively lockdown the building and quickly places its occupants out of immediate danger.

This action clears the hallways and common areas of trapped victims and further isolates active security motion detectors to that of the suspect's movement. Once acquired, the suspect(s) are tracked by police at remote monitoring stations through active motion detectors and real-time video surveillance for confirmation. The creation of multiple "Hot Zones" in each hallway gives law enforcement multiple opportunities to disable or incapacitate the shooter(s) while officers are en-route to the scene.

The present invention is also directed to providing systems and methods for remotely monitoring sites to provide real-time information that can readily distinguish false alarms from real ones and that can identify and track the location of an alarm and/or its cause with substantial precision. In exemplary embodiments, suspect notification capabilities can be implemented through the use of multistate indicators in a novel interface that permits information to be transmitted using standard network protocols from a remote site to a monitoring station in real-time over preexisting communication network transmission pathways (e.g. wire, fiber optic, wireless and satellite.) Communications can thereby be established between a centrally located host monitoring station and a separate security alarm panel deployed in each of the buildings to be remotely monitored. Using this suspect notification information, an operator at a first responder/police monitoring station is able to identify through electronic intelligence that an Active Shooter incident, for instance, is underway and is able to gain a subject description and precise subject location using the same communication network transmission pathway or pathways. In this way, the first responder/police monitoring station operator can track the shooter in real-time and prepare to initiate remote nonlethal counter measures when the shooter enters a predefined "Hot Zone."

Embodiments of a system in accordance with the present invention utilize a graphic user interface. The information received from the sensors comprise a self-initiated notification signal indicating a change of the value of a parameter measured by at least one of the plurality of sensors. The information may be received at substantially the same time the change is measured. In some embodiments, motion is displayed as an icon, and the color of the icon may indicate the suspect's current position which can be confirmed with video intelligence. Another embodiment of the present invention provides a system for monitoring a space having a plurality of sensors. Each of the plurality of sensors is located at a predetermined monitoring location. A monitoring system is configured to receive a substantially real-time self-initiated notification signal indicating a change of a value of a parameter measured by at least one of the plurality of sensors.

Based on the notification signal, a graphic interface is configured to display the value of the parameter measured by the at least one of the plurality of sensors. The term security alarm panel, as used in this specification, includes a wide variety of security/fire panels that are in communication with sensors, and that are capable of providing simultaneous information to multiple monitoring systems. Security alarm panels may include, but are not limited to, panels for monitoring an alert to a shooting incident, the location of the shooting incident through multi-state security motion detectors, subject and weapons description through remote access video intelligence, safe havens that are currently under attack through electronic signaling station activation and shooter movement and current location in time through initial lock on and subsequent tracking through motion detectors, video surveillance and RFID friend/foe tracking.

In exemplary embodiments, the software installed at a fixed monitoring site has the capability to initiate real-time output control measures such as unlocking and locking doors, activating fire suppression canisters and in case of an Active Shooter incident these remote controlled canisters can be nonlethal incapacitating agents such as pepper spray/smoke, ammonia. The real-time transmissions of sensor data integrated with live video is critical for having accurate position data of the shooter and for understanding when the shooter has entered a "Hot Zone" thus enabling accurately firing the counter measure.

The term parameter is meant broadly to encompass a wide range of parameters that can be measured by a sensor. Parameters include, but are not limited in a security environment to, motion, emergency signaling, positioning in a building (RFID), a measure of signal integrity or bit error rates in communications transmissions facilities such as fiber-optic cables, geometric position of various mechanical devices such as locks and any other parameters, such as those parameters mentioned herein, that may be measured such that a state or change in state of the parameter may be determined. The term parameter may also include, as a further example, the state of a signal that displays the location of trapped victims.

Embodiments of the present invention can provide primary visual alarm status reporting that gives the monitoring authority (e.g. a first responder) the ability to identify the precise location of a suspect, and to distinguish false alarms from real ones. Multiple state, or multistate, indications are provided to represent a sensor. For example, in various embodiments, each sensor may be identified as being: (1) currently in alarm; (2) currently in alarm and acknowledged by a monitor; (3) recently in alarm; (4) not in alarm; (5) disabled; or (6) non-reporting. These embodiments are integrated with remote activation of nonlethal counter measures with these multistate indications, the movements of a suspect can be tracked with precision. This precise tracking ability gives law enforcement officers at remote fixed sites the tactical advantage at the scene as they know the location of the shooter, and can track any subsequent movements so as to activate counter measures when the Shooter(s) enter a predefined "Hot Zone."

Given the availability of precise location information enables the responding officers to activate counter measures designed to disable/disorient or possible incapacitate the suspect, thus ending the attack and giving Building Entry Teams a decisive tactical advantage.

Exemplary embodiments of the present invention are directed to a method and apparatus for monitoring a space. A security panel is associated with a plurality of sensors. A monitoring system receives real-time or substantially real-time information regarding the space from the security panel over a network using a network protocol. The monitoring system includes a graphic interface to display said information as multistate outputs associated with each of the plurality of sensors. Also, the security alarm panel is often referenced in this disclosure as being located at the space or building. While the physical location of a physical panel can be within the confines of the space or building, the security panel may also exist remotely in terms of data and information in off-site servers. These off-site servers may also receive and process and present the on-site sensor information and display parameters.

BRIEF DESCRIPTION OF THE DRAWINGS

In FIG. 1, the right hashed  security sensors are disabled to allow occupants to freely roam through the building while the fire sensors are always enabled. The covert chemical canisters remain dormant until such time the building goes into alarm. Once in alarm, the icons representing the chemical canisters become "hot." At that time, a trained responder, with access to a monitoring terminal can selectively release the chemical nonlethal agent on the intruders based on real-time emergency information. The legend identifies sensor types and illustrates two possible multi-sensor states, not in alarm and in alarm.

In FIG. 2, security sensors are disabled to allow occupants to freely roam through the building while fire sensors are always enabled.

In FIG. 10, motion sensors located in locked rooms have been disabled while motion sensors in corridors and public bathroom are enabled to support tracking. All signaling stations have been activated and safe room doors locked. By examining the state of the corridor motion sensors, the incident commander monitoring the evolving situation deduces that the shooter(s) entered the building on side D, moved into the BD corridor and the AC corridor checking safe room doors. Note that the last motion sensor in the AC corridor has not been activated indicative that the shooter decided to return to the DB corridor. Notice the motion sensors in the DB and AC corridors have been activated and in the recently in alarm state illustrating the path the shooter(s) took through the building. Further, note that the motion sensor on the B side of the building is currently in alarm while all other corridor sensors are either not in alarm or in the recently in alarm state. With this real-time information the incident commander can activate the BC corridor cameras to identify and determine the number of intruder(s) in the building and verify that the intruder is headed to the second level using the stairway on the B side of the BD corridor.

In FIG. 11, motion sensors located in locked and secure rooms have been disabled while motion sensors in corridors are enabled. All signaling stations have been activated and safe rooms have indicated that room occupants are safe. The building security alarms have been activated and the threat icon indicates the school under attack. The incident commander based on the ground floor movement knows that the shooter(s) are going up to the second floor.

With this virtual information the incident commander activates the level 2 video camera confirming the move and deduces that the shooters will move East in the BD corridor. The incident commander then activates the nonlethal pepper spray canisters located in the BD corridor by inputting the proper arming code. The incident commander then watches the active corridor motion sensors as he waits for the intruders to enter the "Hot Zone." As the two shooters move East in BD corridor, the first motion sensor goes into alarm and then displays the recently in alarm icon 162 which indicates the shooters are moving into the "Hot Zone" first corridor. When the shooters enter the "Hot Zone" evidenced by the motion sensor 164 going into alarm, the incident commander activates the three canisters within one (1) second creating a fog of pepper spray/smoke, ammonia.

Figure 12:

FIG. 12 illustrates the spread of the nonlethal pepper spray/smoke, ammonia after the three canisters have been discharged. The pepper spray/smoke, ammonia immediately stops the shooters by obscuring the shooters' vision and causes the shooters to panic as he/they try to move out of the pepper spray/smoke, ammonia cloud. At this point, the incident commander dispatches the BET's wearing protective goggles and monitors their approach using the Friend/Foe virtual tracking technology. The intruders are quickly captured or neutralized. The active shooter incident is over with minimal loss of life.

Figure 13:
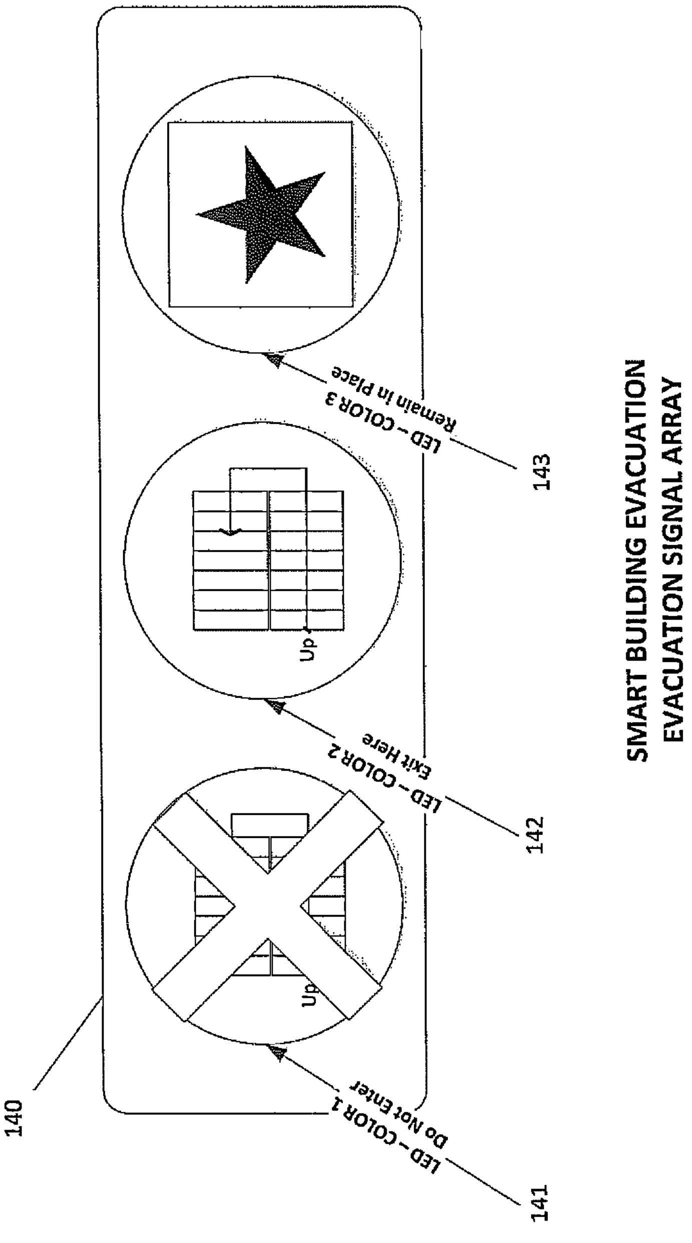

FIG. 13 illustrates the evacuation signal array with three representative icon states: (1) safe to exit; (2) do not use this exit; and (3) do not move, remain in place. Once the suspects are apprehended and placed in custody, the buildings evacuation signal arrays 140 displays which stairways are safe for the students and teachers to exit the building.

DETAILED DESCRIPTION

The current method and apparatus maybe implemented together with or partially with the method and apparatus disclosed in earlier U.S. Pat. No. 6,281,790, "Method and Apparatus for Remotely Monitoring a Site", issued Aug. 28, 2001; U.S. Pat. No. 6,917,288, "Method and Apparatus for Remotely Monitoring a Site", issued Jul. 12, 2005; U.S. Pat. No. 6,972,676, issued Dec. 6, 2005; U.S. patent application Ser. No. 13/313,512, "Method and System for Enabling Smart Building Evacuation", filed Dec. 7, 2011; U.S. patent application Ser. No. 13/534,582, "Method and System for Enabling Smart Building Rescue", filed on Jun. 27, 2012; and U.S. patent application Ser. No. 13/682,959, "Method and System for Monitoring of Friend and Foe in a Security Incident", filed on Nov. 21, 2012 which are incorporated herein by reference in their entirety.

The present method and system provide the tools for a first responder in this case a police incident commander located at a fixed monitoring site using a tactical work station, to locate and identify a suspect and track his/their movements within a building. Furthermore, the incident commander has the ability to delay and stop the intruder(s) ability to wander unchallenged through the building. More importantly, the incident commander has precise command and control and can initiate in real-time, nonlethal counter measures when the suspect intruder enters a preinstalled "Hot Zone." The discussion that follows often references a single building that is being monitored and that is able to be managed by a first responder. The method and system is able to be deployed in two or more buildings equally efficiently.

In each building, a plurality of sensors and signaling devices are installed in hallways, common spaces and occupied space such as offices, conference rooms, and class rooms designated as "Safe Rooms." These devices provide real-time electronic intelligence as to the probable location of suspect(s) and their movement within the building while video surveillance is used to confirm suspect identification.

The building's security alarm panel is operatively and simultaneously linked to security sensors and signaling arrays which are further directly linked to first responder police computers located at multiple sites to include the 911 police dispatch center as well as in responding emergency vehicles.

When a building security sensor is activated, the alarm is immediately sent to multiple monitoring stations including the 911 police dispatch center, the police district station and to a monitoring station at police HQ. The operators/officers monitoring the alarms are able to call up building floor plans containing sensor location maps on computers linked directly to the building. Using this electronic intelligence, the officers determine unequivocally that the site is the location site of a suspect event in progress.

The discussion herein is directed to the identification, tracking and neutralization of a suspect intruder. The suspect may be involved in an active shooter incident, kidnapping, arson or any other unauthorized activity. A suspect referred to by example as a shooter herein may equally refer to any intruder.

Police officers using this technology are able to initially identify the probable location and movement of the suspect using an array of security sensors signaling real-time multi-state changes. This real-time electronic intelligence is used to confirm the location and direction of movement within the facility while video surveillance provides subject description. These same police operators now are tracking the suspect through motion detectors in alarm and video surveillance so as to maintain contact with the suspect(s) while they roam through the building. Thus video surveillance provides verification and enables precise tracking. The police operator manning a tactical work station can accurately pinpoint the suspect's location by motion detectors in alarm and recently in alarm while simultaneously tracking the suspect(s) using live video.

Given that the building has preselected "Hot Zones" that have been equipped with remote controlled canisters containing nonlethal chemical agents like pepper spray, it is possible for the operator to activate these chemical canisters while the intruder(s) move freely through areas designated as "Hot Zones." This capability can significantly slow or stop the "Active Shooter" advance though a building.

To activate a canister, the officer monitoring the system must enter a predefined code which when verified, arms the canisters, an action that physically changes the state of the icons on the graphic display and provides visual confirmation that the chemical dispersion system is armed.

With eyes on the shooter the operator then waits for the closest motion detector to go into alarm. When it does, the officer fires the armed canister with a simple mouse click. Within 1-2 seconds, the nonlethal chemicals contained in the canister are released. The effectiveness of these actions is then determined though the video collected during the activation event. Since the area of the "Hot Zone" is approximately 30 feet, the real-time signaling of the detector and the real-time communication of the output command will place the shooter in the "Hot Zone" at the time of firing thus increasing the effect of the nonlethal chemical agent.

To illustrate how this process can effectively incapacitate the "Active Shooter," the following is a hypothetical "Active Shooter" event to illustrate how these actions can effectively bring an event to an end by significantly stopping the intruder's progress through the building.

Figure 10:
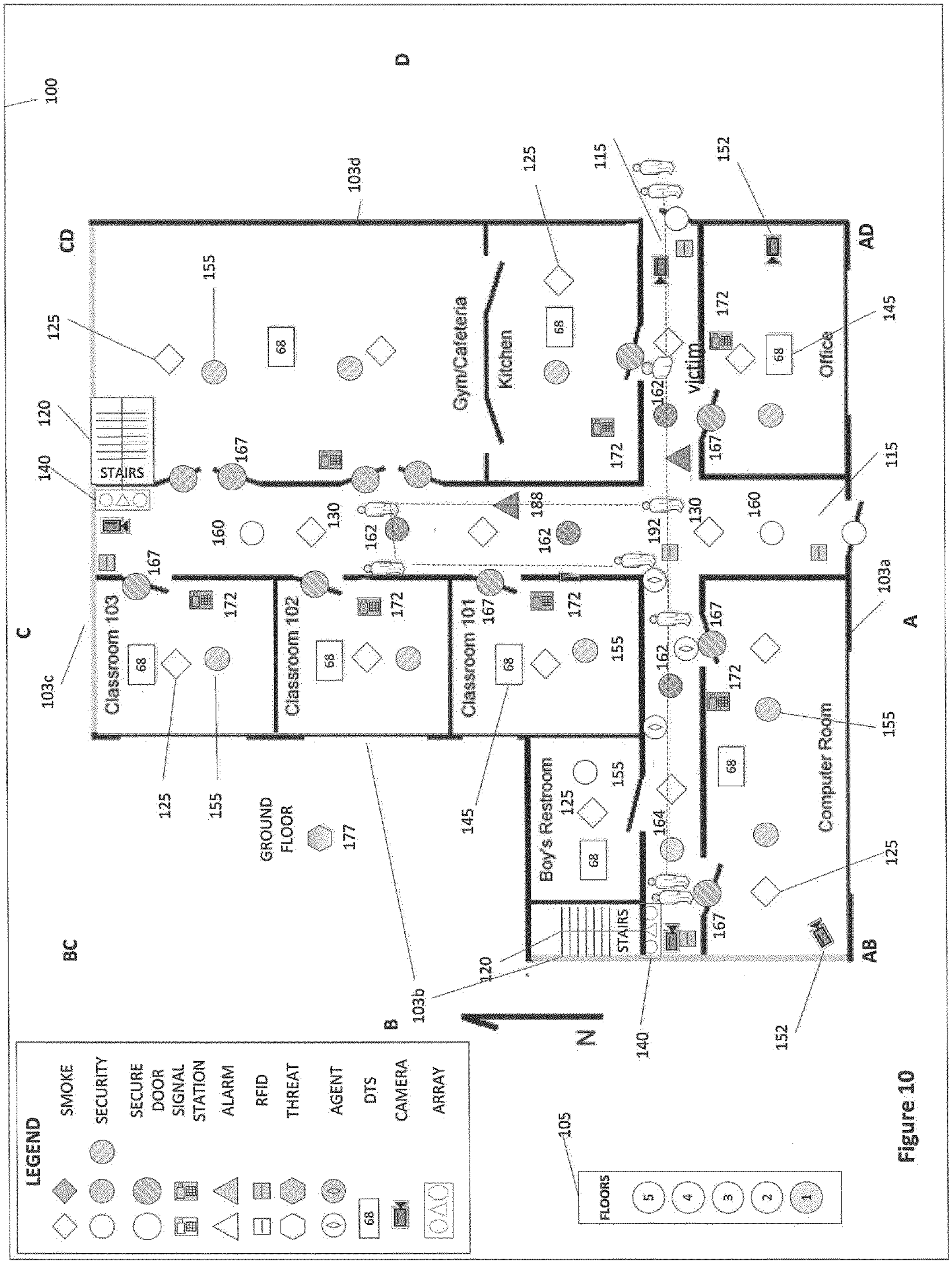
FIG. 10 shows an exemplary graphics screen for the ground floor (level 1) viewed through a security/fire alarm panel screen and fixed and mobile monitoring screens, during an Active Shooter incident, wherein the graphics display contains a floor plan layout for the ground floor, with special icons overlaid on a map to identify activated sensors (security and fire), alarm signaling devices, IP video cameras, and activated RFID readers enabling Friend/Foe recognition and covert control of the nonlethal chemical canisters. The threat icon has been activated on alarm and the schools alarm signaling sirens have been activated.

The following paragraphs detail a police and fire response using real-time information provided by security alarm panel. FIG. 10 corresponds to the "Active Shooter" incident timeline from the point the intruders enter the building while FIGS. 11 and 12 corresponds to the "Active Shooter" incident being mitigated by the use of the nonlethal pepper spray/smoke, ammonia which disorients and effectively ends of the attack allowing police to move in and capture the intruders. The following table is representative of an "Active Shooter" attack on an elementary school.

"Active Shooter" Event Timeline

| Figure | Event Description | Time After Entry (MM:SS) |
|---|---|---|
| 9-10 | Two shooters enter building using D side door. Shooter shoots a student while leaving the ground floor administrative office. | 00:00 to 00:05 |
| 10 | Office staff locks door, and use key fob to place school into alarm. Security panel initiates school alarm directing students to safe rooms. All local and remote monitoring stations receive alarms within 3 seconds. These alarms are received simultaneously by school security and local police dispatch. Once in alarm, the security alarm panel enables all IP video cameras for remote monitoring by responding police. | 00:10 |
| 10 | All classroom motion sensors are disabled. All corridor motion sensors are enabled. Officers at a Police Command & Control Center (C2) networked to school use monitoring software drill to location of threat icon, look for active motion detectors, tap corresponding live video and locate and identify shooters. Shooters continue entry into school corridors. One shooter continues moving into BD corridor, checking doors, and seeking targets. Second shooter moves into AC corridor checking doors, but stops to rejoin first shooter in BD corridor. | 00:15 to 00:30 |
| 10 | C2 activating IP video cameras mounted in DB corridor provide responding officers with suspect descriptions, locations, and weapons descriptions. Both shooters decide to go upstairs using the B side stairs. Note the motion detector in alarm accurately located shooters on vicinity of stairs and IP video camera is used to verify intruder's movement. | 00:31 to 01:00 |
| 10-11 | Incident commander arms "Hot Zone" pepper spray canisters located outside Biology Lab on level 2. [FIG. 10] Shooters move upstairs continue seeking targets. Students alerted have sought refuge in Safe Rooms on all school levels. Signaling station report safe room status information to all monitoring stations. Incident commander has ability to communicate with individual safe rooms using VOIP communications and IP video links. Shooters attempt to enter Biology Lab Safe Rooms by shooting door locks. Hardened locks hold under shooters barrage. | 01:01 to 01:20 |
| 11 | Shooters enter level 2 "Hot Zone" verified by motion sensor in alarm. Incident Commander initiates release of nonlethal pepper spray/smoke ammonia canisters. | 01:21 to 01:35 |
| 12 | Three (3) triangulated pepper spray/smoke ammonia canisters released under control of incident commander. Pepper spray/smoke ammonia disburses slowing, disorienting and stopping both intruders progress. Incident commander orders both BET teams to advance and capture intruders. Incident commander monitors movement of BET's using Friend/Foe tracking technology. Both intruders are captured, disarmed and in custody. | 01:36 to 02:30 |
| | BET's check all classrooms, release students from safe rooms. Active Shooter incident is over, with one victim. | 02:31 to 05:00 |

Figure 1:
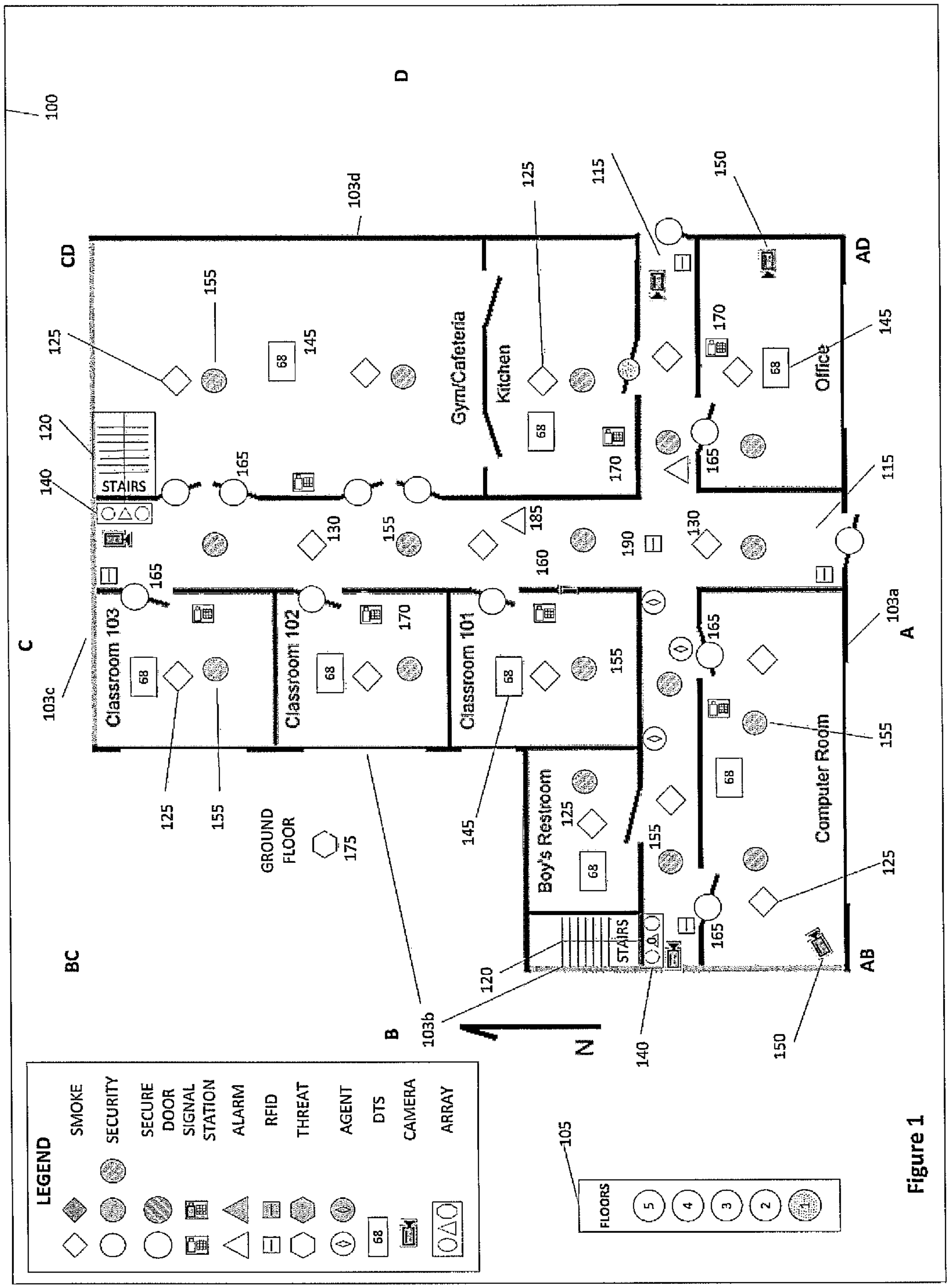
FIG. 1 shows an exemplary graphics screen viewed through a security alarm panel screen illustrating the ground floor (level 1) of the monitored school building, wherein the graphic display contains a floor plan layout, with special icons overlaid on a map to identify security (motion) and fire (smoke and temperature) sensor points and their status, video cameras, signaling alarms, RFID sensors, covert chemical canisters, individual signaling stations and evacuation signal arrays and their status.
Figure 2:
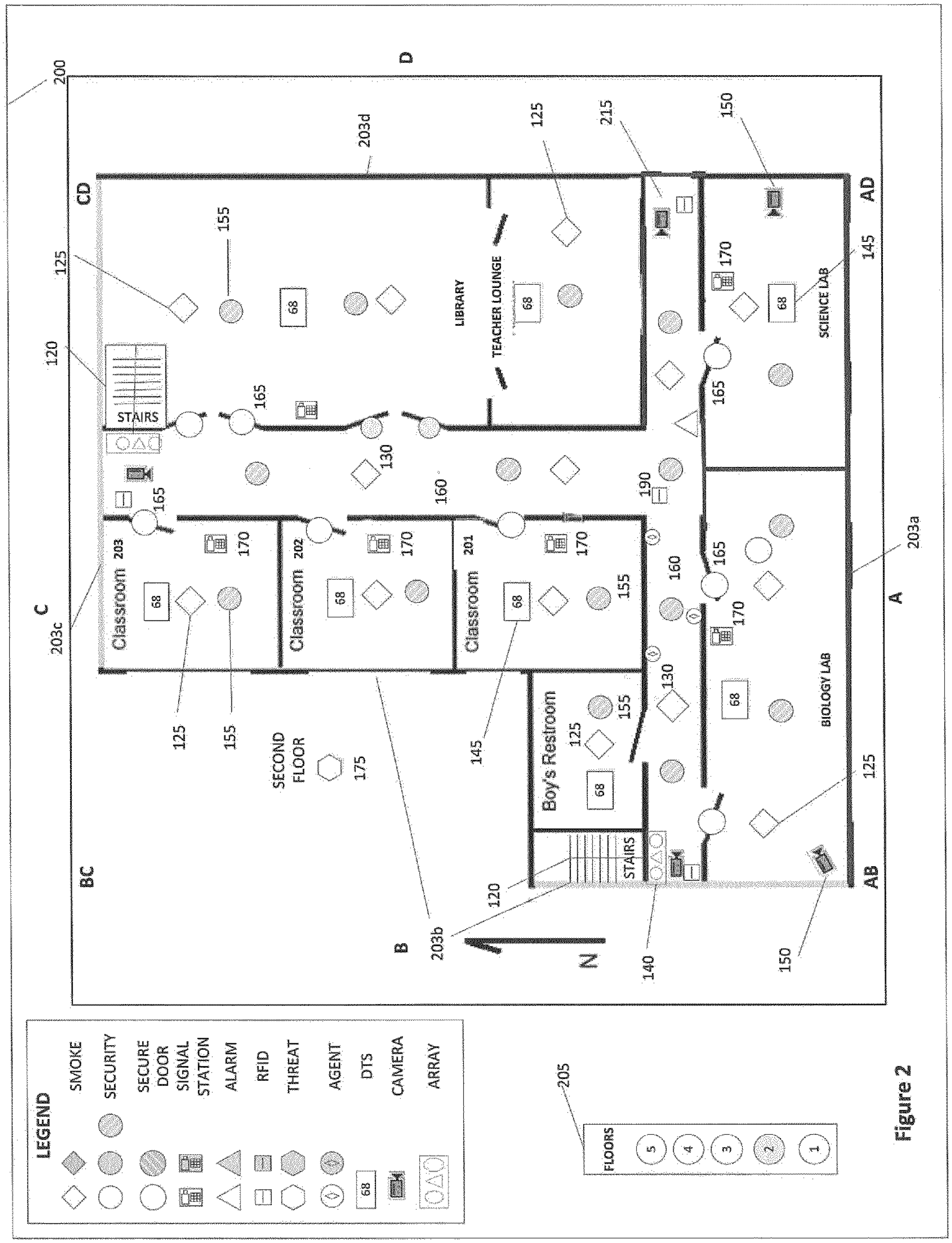
FIG. 2 shows an exemplary graphics screen viewed through a security alarm panel screen illustrating the second floor (level 2) of school building, wherein the graphics display contains a floor plan layout, with special icons overlaid on a map to identify security (motion) and fire (smoke and temperature) sensor points and their status, video cameras, signaling alarms, RFID sensors, covert nonlethal chemical canisters, individual signaling stations and an evacuation signal arrays and their status. The covert chemical canisters remain dormant until such time the building goes into alarm. Once in alarm, the icons representing the nonlethal chemical canisters become "hot." At that time, a trained responder, with access to a virtual command terminal can selectively release the chemical nonlethal agent on the intruders based on real-time emergency information.
Figure 11:
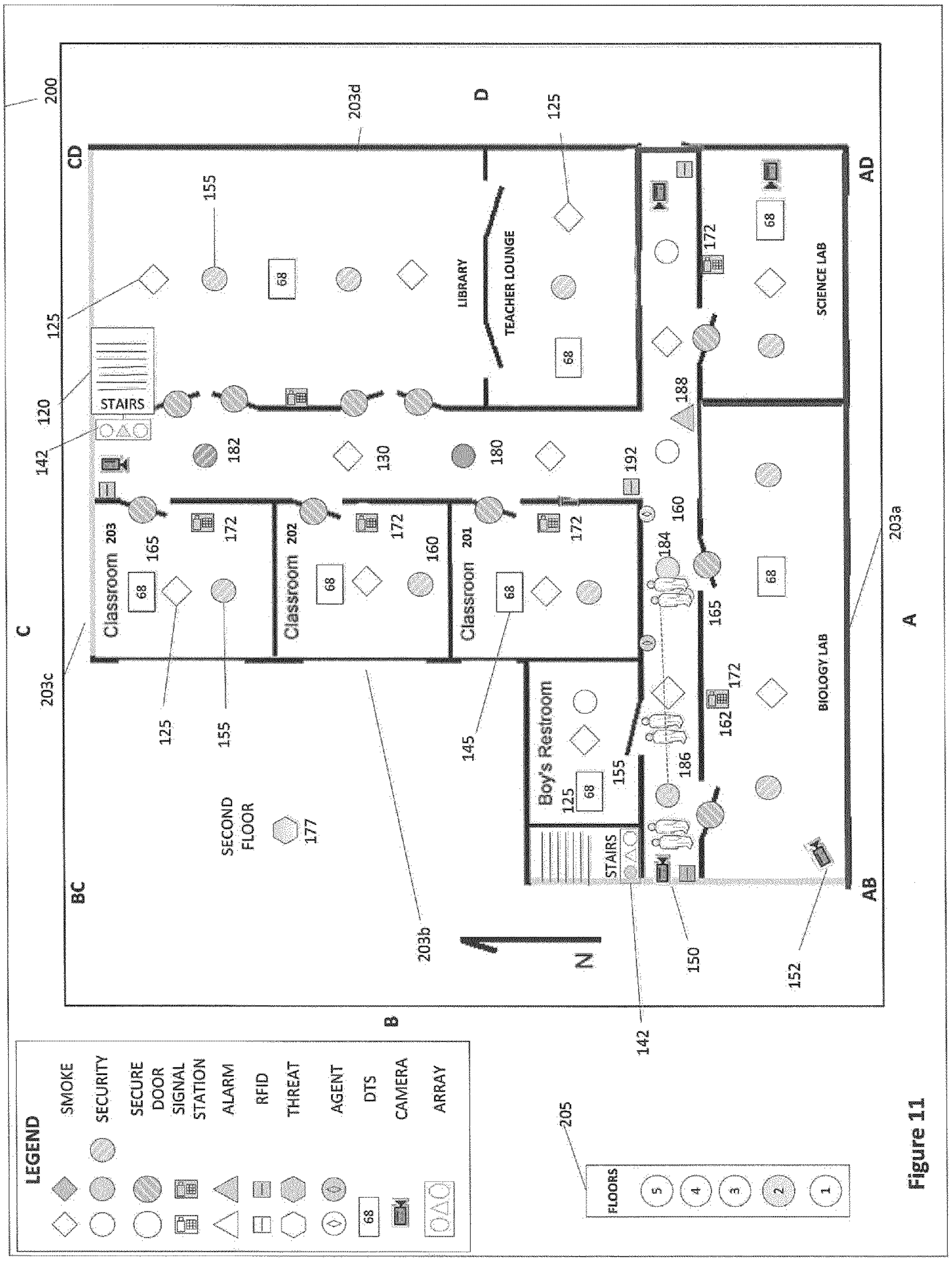
FIG. 11 shows an exemplary graphics screen for the second floor viewed through a security/fire alarm panel screen and fixed and mobile monitoring screens, during the Active Shooter incident, wherein the graphics display contains a floor plan layout for the second floor, with special icons overlaid on a map to identify activated (security and fire) sensors, alarm signaling devices, IP video cameras, and activated RFID readers enabling Friend/Foe recognition in a hypothetical example of an Active Shooter event.

The present system and method are illustrated in FIGS. 1 and 2 which display the building in a normal monitoring state and in FIGS. 10, 11 and 12 illustrating the building in a hypothetical alarm.

FIG. 1 shows a graphics screen containing a floor plan 100 for a multi-story elementary school building. The inactive threat icon 175 is located near the Ground Floor label. The annunciating alarm 185 used to alert occupants of a fire or security emergency is inactive. The building has five floors as shown in the floor table 105. Table 105 has activated the circle with the "1" in it to indicate that floor plan 100 denotes the 1$^{st}$ floor or ground floor of the five floor building. Floor plan 100 includes a building having four sides 103*a*-103*d*. Each of these sides has an indicator labeled A, B, C and D to differentiate the sides of the building floor plan 100.

There are eight rooms shown in this floor plan 100. Three classrooms labeled 101, 102, and 103 are found of the north-south AC corridor. Two hallways 115 are located along the north-south AC corridor and the east-west BD corridor. The RFID readers 190 are located where the two corridors intersect and at the end of each corridor.

There is a Gym/Cafeteria and Kitchen located along the north-south AC corridor across from classrooms 101, 102 and 103. Each room contains digital temperature sensors 145, smoke sensors 125, disabled motion sensors 155 and signaling stations 170. The remaining rooms include a men's restroom, computer room and administration office along east-west hallway BD. Before the start of the incident all motion sensors 155 on all floors of the school are disabled. This allows the students and staff to move freely within the building and not alarming the security panel. Note that the smoke alarms and digital temperature sensors always remain enabled.

Secure IP video cameras 150 are found in the hallways 115, the office and the computer room. All smoke sensors 125 located in individual rooms or hallways 130 remain active at all times. Stairs 120 and emergency evacuation signal arrays 140 are found at the east end BD hallway and the north end AC hallway. Aural signaling devices 185 are located in both the DB and AC corridors.

FIG. 2 shows a graphic screen containing a $2^{nd}$ floor plan 200 for a multistory elementary school building. The inactive threat icon 175 is located near second floor label. The building has five floors as shown in the Table 205. Table 205 has activated the circle with the "2" in it to indicate that this floor plan 200 denotes the $2^{nd}$ floor of the five floor building. Floor plan 200 includes a building having four sides 203*a*-203*d*. Each of these sides 203*a*-203*d* has an indicator A, B, C and D to differentiate the sides of the building floor plan 200.

There are eight rooms shown in this floor plan 200. Three classrooms 201, 202, and 203 are found of the north-south AC corridor. Two hallways 215 are located along the north-south AC corridor and the east-west BD corridor. The RFID readers 190 are located where the two corridors intersect and at the end of each corridor.

There is a library and teacher's lounge located along the AC corridor across from classrooms 201, 202 and 203. Each room contains digital temperature sensors 145, smoke sensors 125, motion sensors 155 and signaling stations 170. Hardened doors 165 enable rooms to become Safe Rooms which are locked down and secured during an Active Shooter incident. The remaining rooms include a restroom, biology and science laboratories along the east-west hallway BD.

Positioned proximate each stairway 120 is an evacuation signal array 140. Each signal array 140 is shown as having three icon states, the first 141 signals safe passage, the second 142 signals unsafe passage while the third 143 signals remain in place, do not move. FIG. 13 graphically illustrates the functional design of the signaling array. The actual signal array 140 may contain the multiple icons 141, 142 and 143 or, alternatively, may constitute a single display that may have the functionality to visually display different icons on a single screen. Finally, there is a temperature icon 145 in each room that sets forth the actual temperature. This temperature icon 145 may also be able to display other real-time temperature information like rate of rise alarm.

FIGS. 1 and 2 show all of the sensors and all of the signal arrays in the open and inactive state with the temperature icon in each room displaying a normal current room temperature. The only icon that is activated are the floor 1 and 2 icons in tables 105 and 205.

Figure 3:
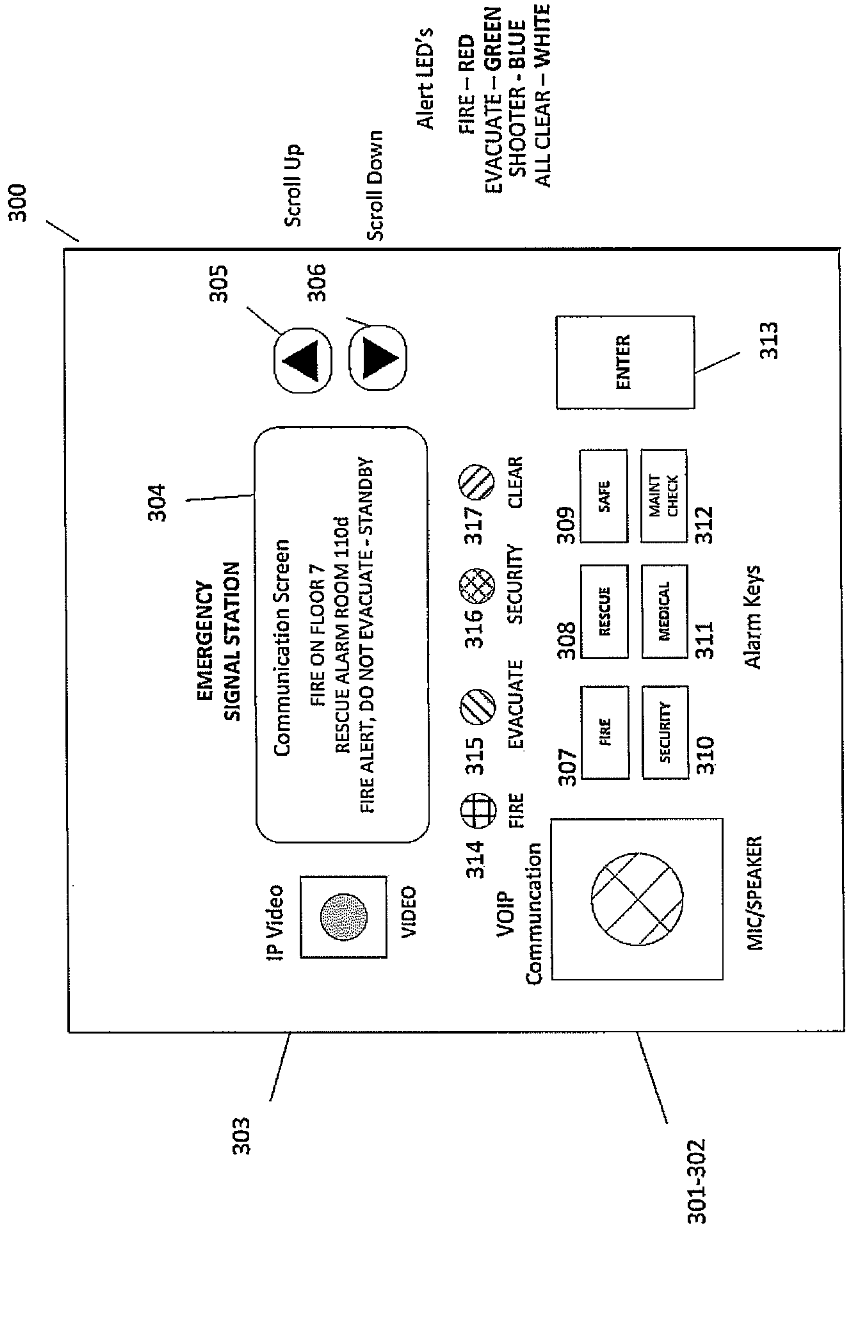
FIG. 3 illustrates the basic design and functionality of an exemplary emergency signaling station with VOIP microphone and speaker, embedded IP video camera, multi-line communication screen and scroll controls, alarm keys for fire, security, rescue, medical, safe, maintenance and enter keys. Four LED lights that indicate fire (red), evacuate (green), security alarm (blue) and all clear (white) status indicators.

FIG. 3 represents the functional design of the Emergency Signaling Station 300. The device includes a microphone 301 and speaker 302 enabling the Incident Commander to communicate directly with individuals in the room. The device also includes an IP video camera 303 enabling visual verification of occupants in room. A multi-lined communication screen 304 allows the control panel to display textual emergency information. The multi-line display is accessible by room occupants using either the Scroll Up 305 key or Scroll Down 306 key. Occupants have six reporting keys which include Fire Emergency 307, Rescue Needed 308, Safe (room secure) 309, Security Emergency 310, Medical Emergency 311 and Maintenance Check 312 followed by pressing the Enter Key 313. Each Signaling Station includes four LED alert lights signifying the current status of the room: 314 Fire Alert (bright red), 315 Evacuate Room (bright green), 316 Security Alert (bright blue); and All Clear (bright white) 317. However, in the Active Shooter embodiment described herein, the blue LED 316 "Security" is used to alert all building occupants that a security incident has started. When the blue "Security" LED 316 is activated the remaining three LEDs 314 "Fire", 315 "Evacuate" and 317 "All Clear" are disabled until the incident ends.

The exemplary embodiments of this invention which provides real-time interactive reporting of facility fire/security status information between four basic subsystems over an Internet/Ethernet communications link. The four subsystems are discussed as follows:

(1) Security/Fire Alarm Panel

This subsystem directly monitors the status of individual sensors and reports their state to the requesting host, remote and mobile computer subsystems. Embedded data sets can be used to provide host, remote and mobile users with detailed information on the site.

While the alarm panel is able to be used in both a fire and a security incident or emergency, it is also possible that fire and security incidents could be handled separately depending on specific conditions. Still further, the security/fire alarm panel could be in a single system, or they could be separate systems that back up each other.

(2) Host Computer

This subsystem, through a communications interface, provides a real-time display of a regional map depicting the location of all the sites within a security network and their status. Other remote subsystems used to remotely monitor the sites can gain access to the fire alarm panel for each site through the host computer display page. A local graphic interface provides the host computer operator access to the same detailed information. Communications programs operating within the host maintain real-time status of the sites/alarm points and continually update the display screen.

(3) Remote Computer

This subsystem accesses the communication program within the host computer which displays a map of the area sites and their current status. Using a mouse, a site can be selected to view the details of its status. Upon selection, the remote subsystem can be directly connected via a hyperlink to an embedded communication program within the fire panel. Similar to the host computer, the screen updates of site and point status is maintained through a communications program.

(4) Mobile Computer

The mobile computer can gain connectivity to the Ethernet network local to the fire panel through a wireless LAN, once it is within the operating range. "Broadcast packets" (for example, encrypted packets which can be decrypted by the mobile computer) can be sent by the fire panel and be used to instruct the mobile computer how to directly access the fire panel's communication interface through a monitoring station program. Once connected to the fire panel, the mobile computer interface may in some alternatives operate like the remote computer. In other alternatives, the mobile computer can only view the evolving emergency.

A. General Communications Overview

Figure 4:
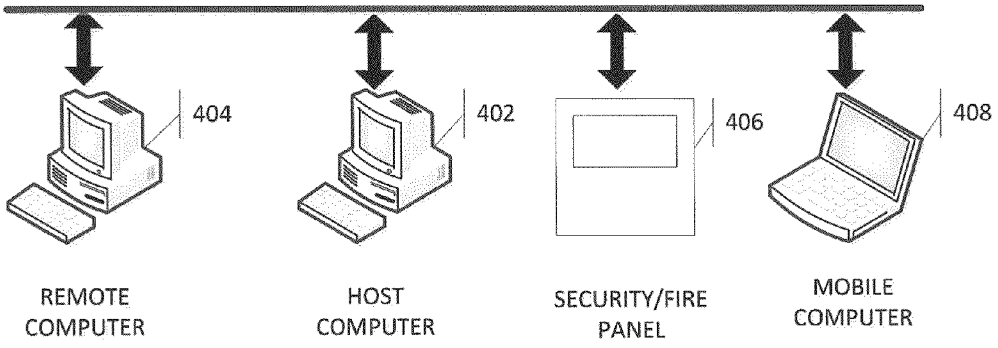
FIG. 4 shows a general overview of communications transpired between four basic subsystems. In this embodiment, the subsystems include remote computers, host computers, security/fire alarm panel and mobile computers.

Communications between the various subsystems of embodiments of the present invention are disclosed in FIG. 4. Standard network communication tools may be combined with unique graphics and communication programs to effect real-time performance through minimal bandwidth. Of course, other communications systems and back-up systems could be deployed.

FIG. 4 provides a general overview of the communications that transpire between the four basic subsystems of embodiments of the present invention; that is, (1) a host computer 402; (2) a remote computer 404; (3) security/fire alarm panel 406; and (4) mobile computer 408. For example, following a power up indication from the security/fire alarm panel, and a connection by the host's local communication program to the security/fire alarm panel's embedded communication program, files regarding site information (such as floor plan) and alarm status information can be sent to the host. Similar protocols can be followed with respect to communications between the remaining subsystems.

Those skilled in the art will appreciate that the information flow represented by the various communications paths illustrated in FIG. 4 are by way of example only, and that communications from any one or more of the four basic subsystems shown in FIG. 4 can be provided with respect to any other one of the four basic groups shown, in any manner desired by the user.

Figure 5:
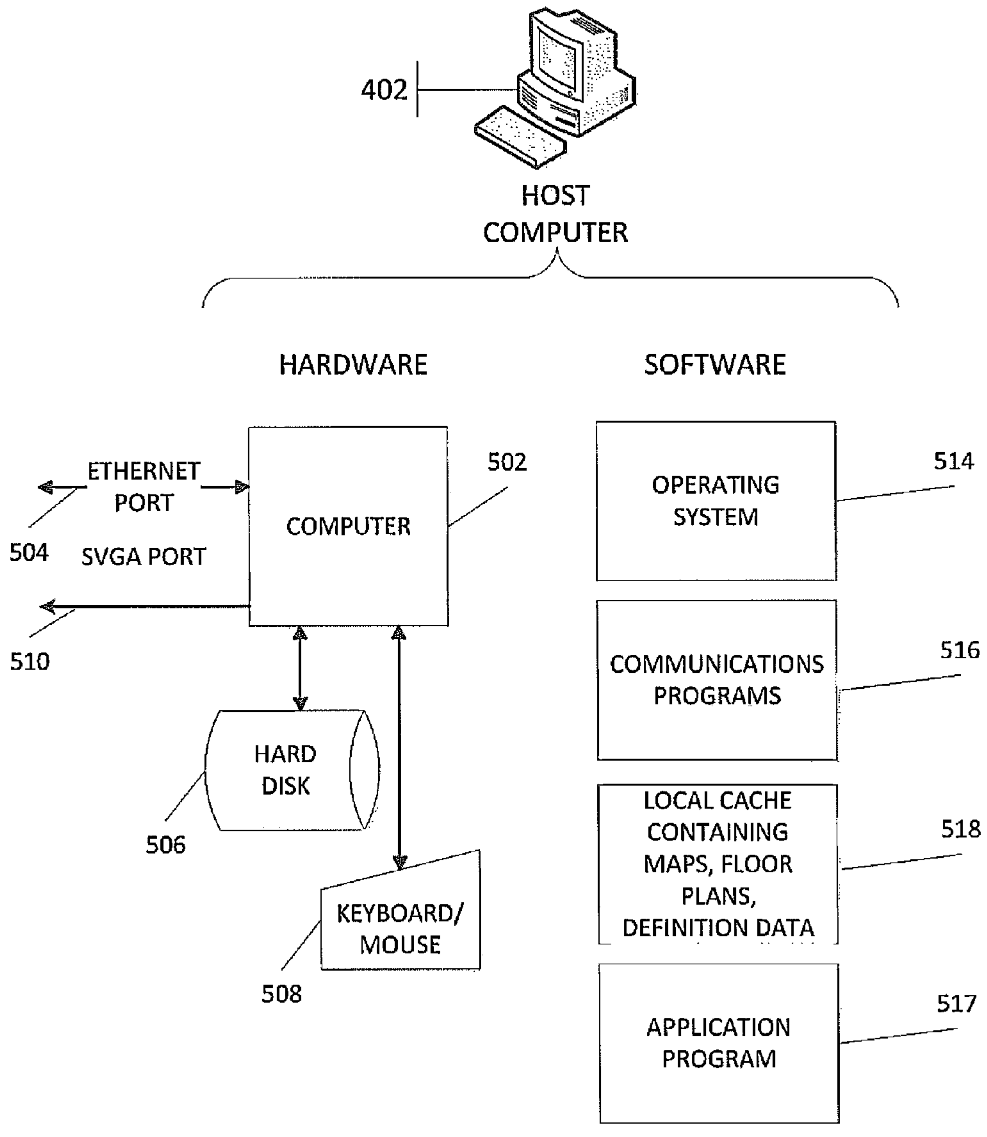
FIG. 5 shows a detailed diagram of an exemplary host computer in a supervisory monitoring system. Each configured computer consists of hardware and software.

FIG. 5 depicts hardware and software components of an exemplary host computer 402. The CPU motherboard 502 for example, (e.g., based on Intel processor or any other processor) is a conventional personal computer that will support any desired network operating system 514, such as any 32-bit operating system including, but not limited to the Microsoft XP® Operating System and/or Microsoft Windows 7®. An exemplary motherboard will feature, or accommodate, Ethernet communications port 504 for interfacing with an Internet or Ethernet network. A hard disk 506 can be installed to support information storage. A keyboard and mouse 508 can be attached for operator interface. A display, such as an SVGA monitor can be attached via an analog or digital video graphics applications port 510 for a visual display unit. The Operating System 514 can be installed in a standard manner, along with the network communication software package 516. An application program 517 is installed. A local cache directory 518 is installed with supporting graphic files (i.e. regional maps), local definition data files, and any other desired information.

B. Remote Computer

Figure 6:
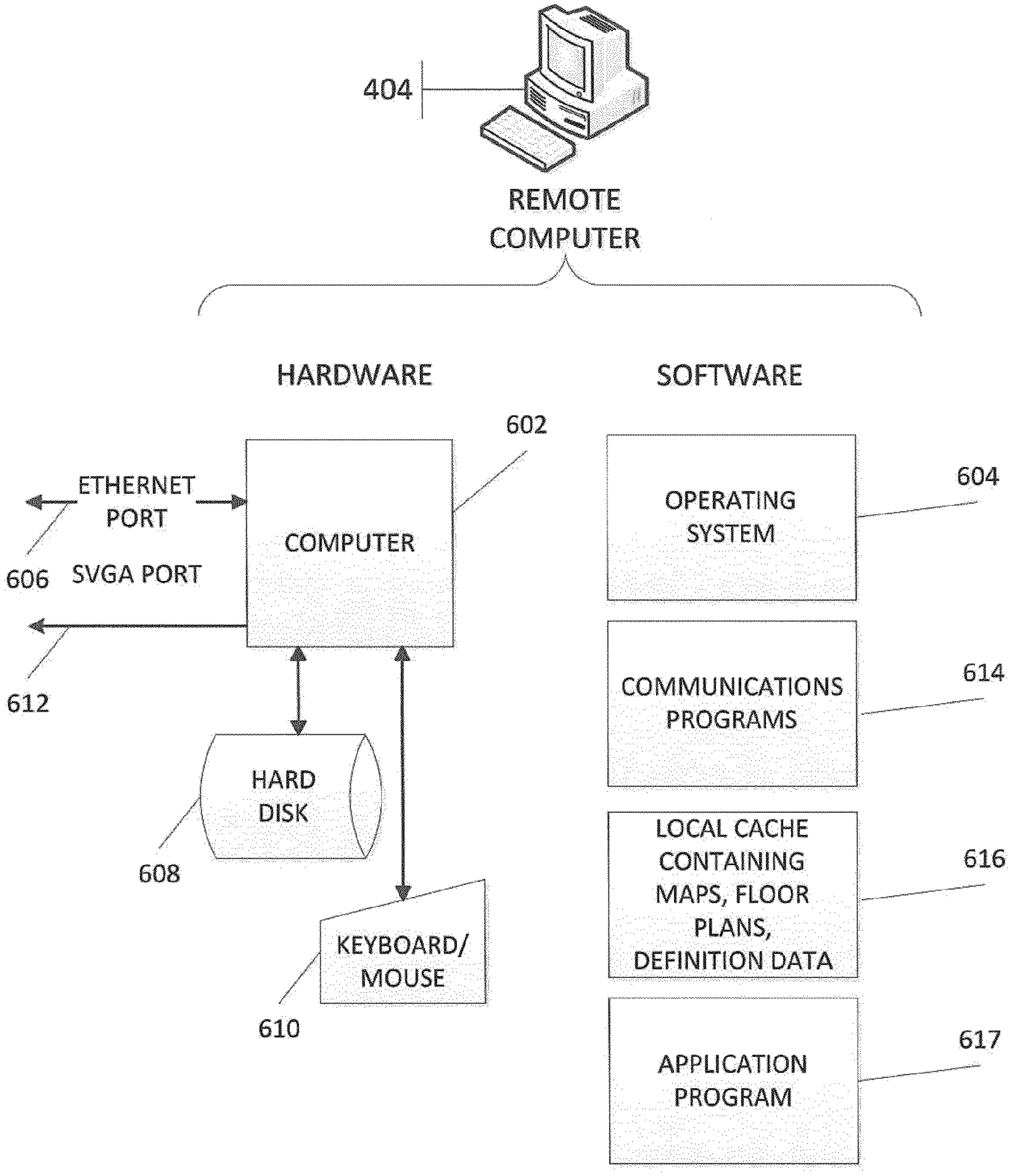
FIG. 6 shows a detailed diagram of an exemplary remote computer. The remote computer is connected to the security/fire alarm panel or the supervisory monitoring computer. Each configured remote computer consists of hardware and software.

FIG. 6 depicts hardware and software components of the exemplary remote computer 404. The CPU motherboard 602 (e.g., based on Intel processor or any other processor) is a conventional personal computer that will support the desired network operating system 604, such as any 32-bit operating system, including but not limited to the Microsoft XP® Operating System or Microsoft Windows 7®. The motherboard will feature, or accommodate Ethernet communications 606 with an Internet or Ethernet network via Ethernet port 606. A hard disk 608 will support information storage. A keyboard and mouse 610 will provide operator interface. An SVGA monitor can be attached via port 612 for a visual display unit. The operating system 604 is installed in a standard manner, along with a communication software package 614. An application program 617 is installed. A local cache directory 616 is installed with supporting graphic files (for example, individual room layouts, floor plans, side view of multi-story facility, and so forth), local definition data files, and other local data files.

C. Security/Fire Alarm Panel

Figure 7:
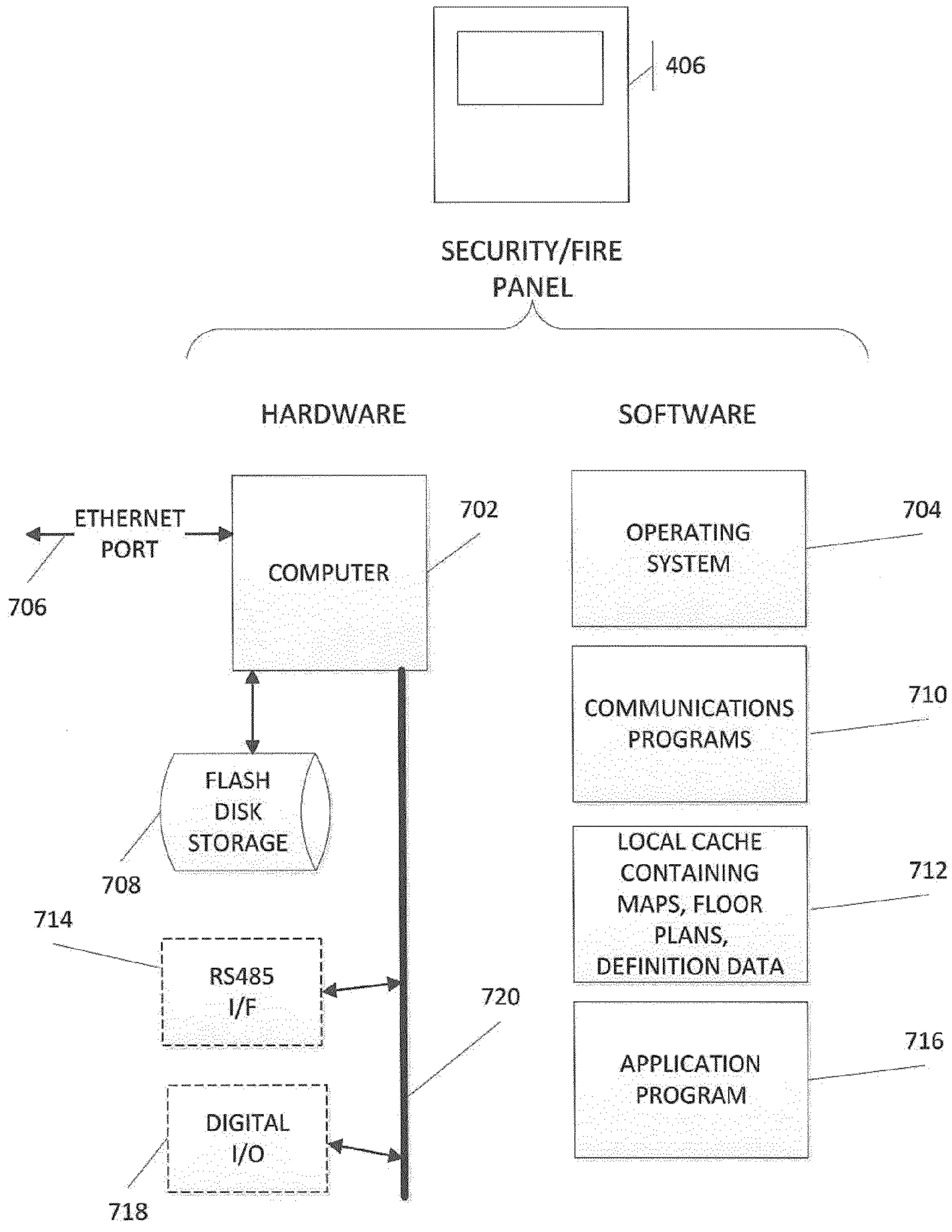
FIG. 7 shows a detailed diagram of an exemplary security/fire alarm panel. In this embodiment, the control panel is capable of supporting both security and fire alarms simultaneously.

FIG. 7 depicts hardware and software components of the exemplary security/fire alarm panel 407. The CPU motherboard 702 (e.g., based on Intel processor or any other processor) is an embedded computer that will support the desired network operating system 704 such as any embedded 32-bit operating system including, but not limited to the Microsoft embedded XP® operating system and Microsoft Windows 7®. The motherboard will feature, or accommodate Ethernet communications with an Internet or Ethernet network via Ethernet port 706. A "flash" disk 708 will support information storage. The operating system can be installed in a standard manner. A communication program 710 is installed. A main application program 712 is also installed, including local data files, and the primary data repository 716 for all graphics and definition files related to the site monitored by this Panel. Communications protocols, such as RS485 communications protocols 714, are supported to facilitate communications with the sensors, sensor controller and other access devices. As supporting inputs, direct digital I/O boards 718 can be added to the local bus 720.

D. Mobile Computer

Figure 8:
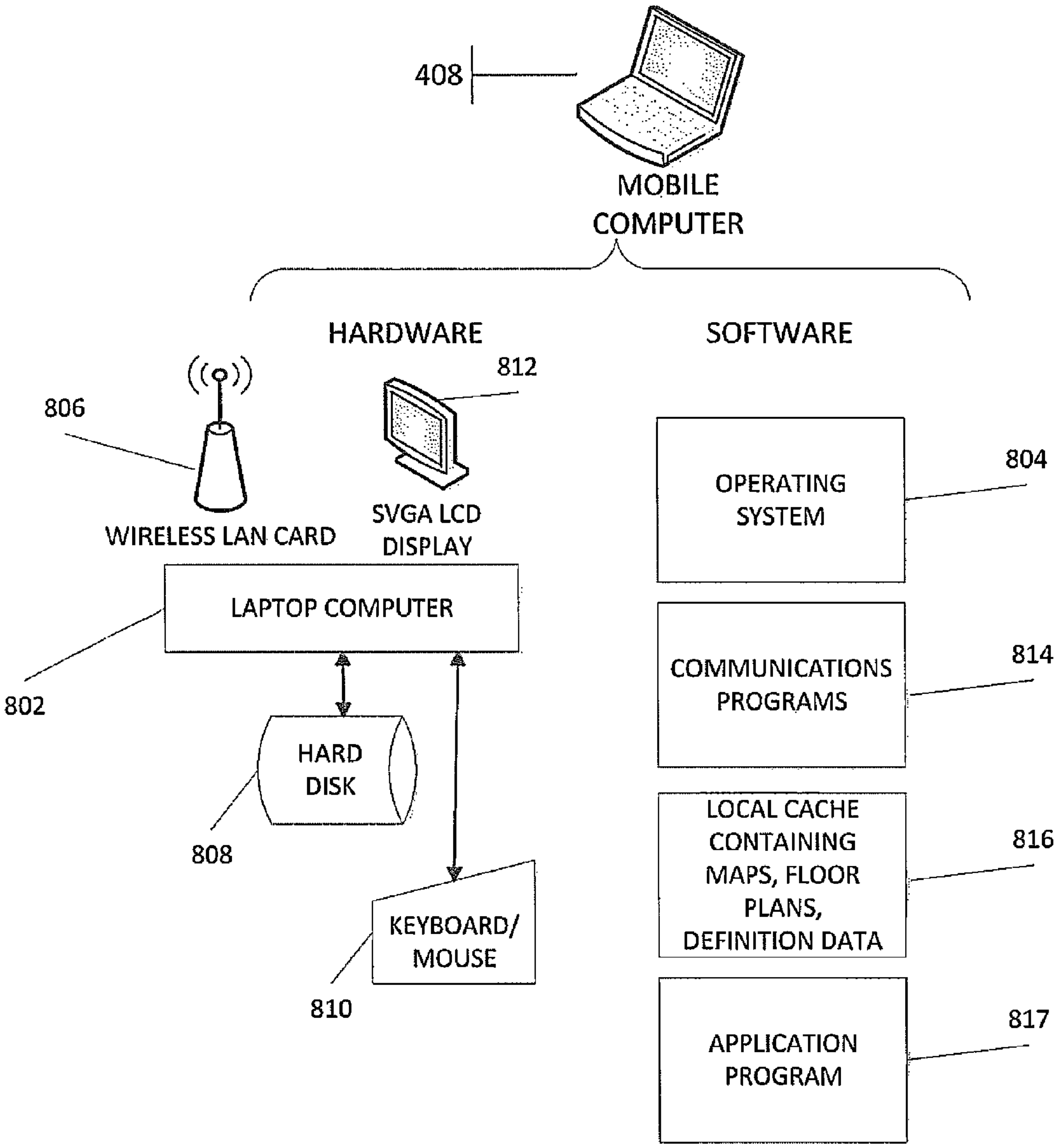
FIG. 8 shows a detailed diagram of an exemplary mobile computer. Each configured mobile computer consists of hardware, software and a wireless network connection.

FIG. 8 depicts the hardware and software components of the exemplary mobile computer 408. The CPU motherboard 802 (e.g., based on Intel processor or any other processor) is a conventional laptop computer or other mobile computing platform that will support the desired network operating system 804, such as any 32-bit operating system including, but not limited to the Microsoft XP® Operating System or a 64-bit operating system like Microsoft Window 7®. Add-on boards can be installed to interoperate with, for example, IEEE 802.11 Ethernet communications 806. A hard disk 808 is installed to support information storage. An integral keyboard and mouse 810 are attached for operator interface. A display, such as an SVGA LCD monitor 812 is attached for a visual display unit. The operating system can be installed in a standard manner, along with a communications software package 814 and application software package 817. A local cache directory 816 is installed with supporting graphic files (i.e. individual room layouts, floor plans, side view of multi-story facility, and so forth), local definition data files, and other local data files.

Those familiar with the art and using commercial off the shelve (COTS) software like GOTOMYPC® or Team Viewer® could also monitor and control the system using either smart phone technology and/or an Apple iPad® or an Android based tablet like the Kindle Fire HD®. These systems can be used to interact with the system.

E. Mobile Security Panel Communications

The mobile computer may gain access to the security/fire alarm panel through a wireless local area network, enabled by a wireless LAN hub and/or any available wireless network including, but not limited to existing cellular telephone networks. The mobile computer communication software is executed and seeks to connect to the security/fire alarm panel's embedded communications program. When access is allowed, the remote computer requests that the embedded communication program download the definition data files that define the security/fire alarm panel's display page. The definition data files include a reference to a graphics file. If the current version of the file does not locally exist, the remote computer requests the HTTP transfer of the graphics file from the security/fire alarm panel. Once received from the security/fire alarm panel in response, the graphics file is locally stored (in cache directory) and is displayed. Once the required data is determined to be located on the remote computer, the communications program begins a continuous polling sequence, requesting the status of the various points via a status request. When the communications program receives the response status messages, all the icons overlaying the graphics screen are repainted to indicate the current status of the points.

The RFID readers 190 are installed in the halls collocated with hallway motion detectors. However, in the event that the exit doorways are spaced apart in any substantial length, then the display arrays may be mounted in sequential distances between the various exit doors.

Once the building goes into alarm, the Signaling Stations 172 located in each "Safe Room" are placed into an active state. In this embodiment, the Signaling Stations provide two way communications between the "Safe Room" occupants and first responders. They provide room occupants with status and responding officers with detailed information about the occupants in the room including occupant number and condition.

The Evacuation Signal Arrays 140 and illustrated in FIG. 13 may have any number of visual signals programmed to be presented to a person in the building. The amount of information that may be conveyed is limited only by the reasonable visual surface of the array and the complexity of the signal to be communicated. Those signals may include words and/or sound instructions, for instance voice instructions. In still further examples, the signal arrays mounted in one or more of the stairwell, hallway or room locations may include interactive audio abilities. The signal arrays may be activated to give general audio instructions regarding an "Active Shooter" event and to seek Safe Havens and execute lockdown procedures. Different protocols may be used to activate the various audio messages or audio interactions that may be appropriate or needed.

In embodiments of the present invention, alarm information is transmitted to and displayed by a monitoring system including one or more mobile devices, such as personal computers equipped with wireless communication capabilities, used by police/firefighters or hazardous materials or other response personnel as they travel to the space in response to an alarm. As the sensor states change in response to parameter-value changes in the monitored space, these response personnel can receive that information in near real-time, and can develop a strategy, as they travel to the monitored space, for addressing the problem that triggered the alarm. In situations where an alarm requires responses by multiple teams such as a large fire or chemical fire requiring fire, police, rescue and environmental teams embodiments of the present invention provide each team with mobile monitoring capabilities displaying the same information, including sensor state changes about the alarm situation, in near real-time. Responders using Emergency Response Stations may take active command of the developing situation. For example, to manage the event, the incident commander may direct several first responder Building Entry Teams to enter the building and direct their response in real-time. These teams have the ability to develop a plan and coordinate their planned actions as they travel to the monitored site, thus improving the timeliness and effectiveness of their response and enhancing their own safety.

Figure 9:
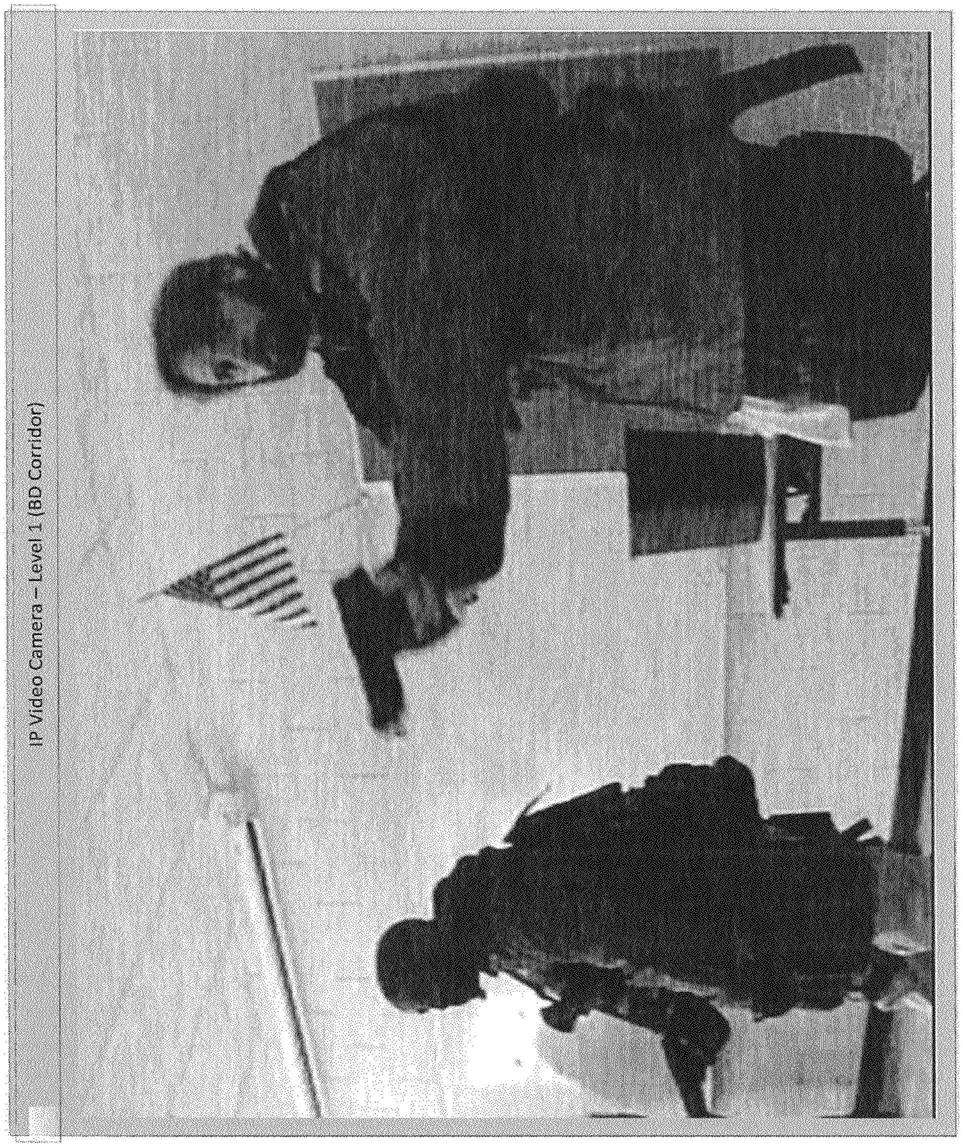
FIG. 9 shows an exemplary IP video screen viewed through both fixed and mobile monitoring computers wherein the display contains an exemplary picture of active shooter intruders, enabling response teams to determine suspect and weapon descriptions and location based on the location of IP camera selected.

FIG. 9 illustrates the start of an Active Shooter incident on the campus. In this case, two shooters enter building and proceed to seek targets of opportunity. Using a key fob, any teacher or administrator simply presses the key fob to place the school building in alarm. Once in alarm, all motion sensors 155 located in interior rooms are disabled while corridor motion sensors 160 are enabled. Hardened doors 167 enable rooms to be locked down and secured during an Active Shooter incident. Secure IP cameras 150 are found in the hallways 115 and the office and computer rooms. All smoke sensors 125 located in individual rooms or hallways 130 remain active at all time. Stairs 120 and emergency evacuation signal arrays 140 are found at the east end BD hallway and the north end BC hallway. Aural signaling devices 187 are located in both the DB and AC corridors and are activated during the emergency to provide aural warning of a fire or an Active Shooter event. All individual "Safe Room" signaling stations 172 are now enabled allowing direct communication between room occupants and first responders. Previously disabled IP video cameras 150 become enabled 152 allowing first responders the opportunity to obtain a subject description and possible determine the level of armament carried by each shooter. Finally, all RFID 190 readers become active 192 allowing first responder to utilize the friend/foe discrimination capability of the security system.

FIGS. 10 and 11 are similar to FIGS. 1 and 2 but contain real-time information received from the security control panel during the Active Shooter incident. FIG. 10 represents real-time emergency information for the ground floor displayed on all monitoring screens while FIG. 11 represents the real-time emergency information displayed on all monitoring screens for the second floor. FIG. 12 is similar to FIG. 11 but represents the point where the incident commander activates the nonlethal pepper spray/smoke ammonia to disable the active shooters when they enter the second floor "Hot Zone."

FIGS. 10, 11 and 12 illustrate the monitoring screens displayed at all monitoring sites during the Active Shooter incident. The active threat icon 177 is located near floor level indicator on each screen and was activated by the emergency key fob when the building was first placed into alarm.

FIG. 10 illustrates the ground level floor plan where real-time emergency information is displayed during the time when the intruders search the ground floor for victims and then decide to go up to the second floor. FIG. 11 continues monitoring the intruders on the second level by providing real-time emergency information.

Using the Active Shooter timeline table the incident begins when Active Shooters, FIG. 9, enter the school building using the side D outside door at 00:00 marking the start of the attack. One student leaving the Administrative Office is shot (00:05) and severely wounded. On hearing the shot, the principal presses the emergency key fob (00:10) and locks the office door, placing the school building into an Active Shooter alert. The blue LEDs on the individual room signaling arrays activate 172 and flashes. Simultaneously the school audio alarm system 188 sounds the alarm. Immediately students begin moving to their assigned Safe Rooms. All IP cameras 152 in the building are now available for use by external police monitors. Within 3 seconds of the start of the incident off-campus police receive the building alarm from the control panel initiated by the principal pressing the emergency key fob. At 00:15 the police dispatch units to the school. Responding units including the Incident Commander begin using their wireless mobile data stations to monitor the incident in real-time. As students move to Safe Rooms, the security control panel disables individual room motion sensors 155 while resetting all hallway motion sensors 160.

By 00:25 shooters separate and start searching both hallways 115. One shooter moves into the north-south AC hallway while the second shooter moves down the east-west DB hallway. Police on route continually receive sensor status information within three seconds of a sensor state change. Shooters continue down hallways trying to open individual room doors. Safe room hardened door locks 167 in ground floor rooms 101, 102 103, Gym/Cafeteria, Kitchen, Office and Computer Room are all activated once students reach the Safe Room. All emergency signaling stations 172 are activated and report status to control panel and to monitoring police officers. Responding officers watch intruders moving through the AC and BD hallways using hallway motion sensors in various alarm states, i.e. 160 (not in alarm), 162 (recently in alarm) and 164 (currently in alarm) thus providing responding officers with the path intruders take while walking, checking room doors on the ground floor of the building.

Police officers arrive at school building at 03:00. RFID readers 192 co-located with motion sensors will automatically receive emitting signals from RFID tags embedded in the BET tactical tablets thus enabling the Friend/Foe tracking system. The incident commander determines that the shooters have moved to the second floor and maneuvers two building entry teams (BET1 and BET2) to maneuver in front and behind the shooters to fix them in between the units. BET officers carrying wireless mobile data computers with RFID tags immediately change motion sensors in vicinity of BETs to blue indicating Friend. As soon as the Active Shooters enter the BC stairway, the incident commander arms the non-lethal pepper spray canisters located in the Level 2 "Hot Zone."

FIGS. 11 & 12 illustrate the pincer movement designed to capture the active Shooters. Motion sensors can now be seen in two colors, yellow for the intruders and blue for the police. The motion sensors now representing Friend and Foe are labeled 180 Friend in alarm, 182 Friend recently in alarm, 184 Foe in alarm, and 186 Foe recently in alarm. In this way, the incident commander can follow BET2's movement in the AC corridor where the sensor labeled 180 indicates the current position of BET2 while the motion sensor labeled 182 indicates that BET2 recently passed the sensor clearly marking the direction of movement of the police entry team.

The Active Shooters reach level 2 and enter the BD corridor moving east. Security motion sensor 186, Foe recently in alarm, represents the shooters moving pass the first motion sensor into the BC corridor. Responding officers and the Incident Commander utilizes the hallway IP cameras to actively monitor officer's approach to the Active Shooters. The IP camera 150 located in the second floor east-west hallway ED displays the picture, illustrated in FIG. 9, of the two intruders located outside biology laboratory providing responding officers with suspect description and location. Security motion sensor 184 remains in alarm and yellow indicating the precise location of the intruders while security yellow motion sensors 186 show the recent location of the intruders as recently in alarm.

This is the point where the incident commander is waiting for the intruders to enter the "Hot Zone" located in BD corridor. When the shooters activate motion sensor 184 indicating that the shooters are in the "Hot Zone", the incident released the non-lethal pepper spray/smoke, ammonia combination. FIG. 12 illustrated the spread of the chemical spray in the "Hot Zone." Now the shooters are blinded and confused. The Police BETS begin moving toward the shooters in the "Hot Zone" and bring the incident to an end.

The Incident Commander now begins instructing his teams to bring the students out of the building. Since the non-lethal pepper spray was used, the incident commander changes the BC stairway evacuation signal array to 141 indicating do not use this stairwell while all other floor signal arrays are set to 142 indicating it is safe to exit using this stairwell.

The Incident Commander declares the ground floor as under control, and authorizes medical treatment for the first victim found outside the ground floor Administrative Office. The incident ends at 05:00. The incident commander communicates All Clear to police command and control who through their Emergency Response Stations which activates the All Clear LED on the class room signaling station lighting the White Led and sending the All Clear message.

The non-lethal device herein may release the pepper spray/smoke and ammonia combination as described. This non-lethal device may include other chemical combinations including, but not limited to, tear gas, nerve agents, liquid sprays, foggers, and combinations of the foregoing. However, the non-lethal device could also be light or sound based in that a bright disabling light flash and/or a disabling sound may also be used to stop a suspect.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A method for engaging a suspect in a building with nonlethal countermeasures inside the building, the method comprising the steps of:

providing a plurality of emergency activation transmitters, a plurality of security sensors adapted to receive signals from the emergency activation transmitters, a plurality of video cameras, a security alarm panel, and a plurality of nonlethal disruption devices;

operatively linking the security sensors, video cameras and nonlethal disruption devices to the security alarm panel;

installing the security sensors, video cameras and plurality of nonlethal disruption devices in a building;

upon activation of an emergency activation transmitter, detecting by a security sensor the activation and sending an alarm to the security alarm panel;

displaying on the security alarm panel the location of the emergency activation on a building floor plan;

installing the plurality of nonlethal disruption devices in a plurality of hot zones in the building, and wherein each nonlethal disruption device is enabled to be remotely activated, and further wherein each nonlethal disruption device is shown on the building floor plan on the security alarm panel;

selecting a video camera proximate the location of the emergency activation and displaying the video feed from the selected camera on the security alarm panel;

identifying a suspect using the video feed from the video camera;

using one or more of the plurality of video cameras to track the location of a suspect and displaying with indicia the suspect location on the building floor plan;

installing the nonlethal disruption device in a hot zone in the building and wherein the nonlethal disruption device is enabled to be remotely activated, and further wherein the nonlethal disruption device is shown on the building floor plan on the security alarm panel;

remotely activating one of the plurality of nonlethal disruption devices when the suspect is proximate that one of the nonlethal disruption devices; and further wherein the nonlethal disruption devices each comprise one or more canisters of chemical spray.

2. The method for engaging a suspect in a building with nonlethal countermeasures inside the building as described in claim 1, wherein each hot zone comprises an installation of a plurality of canisters of chemical spray.

3. The method for engaging a suspect in a building with nonlethal countermeasures inside the building as described in claim 1, further comprising providing a tactical computer that is operatively connected to the security alarm panel that enables a user of the tactical computer to observe the building floor plan upon activation of the emergency activation transmitter.

4. The method for engaging a suspect in a building with nonlethal countermeasures inside the building as described in claim 3, wherein the incident commander is a public safety officer.

5. The method for engaging a suspect in a building with nonlethal countermeasures inside the building as described in claim 3, wherein the tactical computer further comprises a transmitter that is adapted to send signals to the security sensors so that anyone monitoring the floor plan will also visually see the location of the tactical computer.

6. The method for engaging a suspect in a building with nonlethal countermeasures inside the building as described in claim 1, further comprising providing a plurality of detectors operatively connected to the security alarm panel, installing the detectors in the building, and displaying the detectors on the building floor plan.

7. The method for engaging a suspect in a building with nonlethal countermeasures inside the building as described in claim 6, wherein the detectors are selected from the group consisting of motion sensors, infrared detectors, RFID readers, sound detectors, video cameras, smoke detectors and heat detectors.

8. The method for engaging a suspect in a building with nonlethal countermeasures inside the building as described in claim 1, wherein the security alarm panel is located in the building.

9. The method for engaging a suspect in a building with nonlethal countermeasures inside the building as described in claim 1, wherein the security alarm panel is located outside of the building.

* * * * *